United States Patent [19]

Kress et al.

[11] 4,199,284
[45] Apr. 22, 1980

[54] CONICAL REAMER

[75] Inventors: Dieter Kress, Aalen; Friedrich Häberle, Lauchheim, both of Fed. Rep. of Germany

[73] Assignee: Mapal Fabrik fur Prazisionswerkzeuge Dr. Kress KG, Aalen, Fed. Rep. of Germany

[21] Appl. No.: 907,745

[22] Filed: May 19, 1978

[30] Foreign Application Priority Data

May 20, 1977 [DE] Fed. Rep. of Germany ....... 2722794

[51] Int. Cl.² .................. B23B 51/00; B26D 1/12
[52] U.S. Cl. ................................. 408/233; 407/40; 407/51; 407/114
[58] Field of Search ............ 408/228, 229, 231, 233, 408/239, 239 A; 407/33, 40, 42, 43, 47, 51, 61, 114

[56] References Cited

U.S. PATENT DOCUMENTS

| | | | |
|---|---|---|---|
| 330,508 | 11/1885 | Neale | 408/233 |
| 1,521,467 | 12/1924 | Morgan | 407/51 X |
| 2,041,587 | 5/1936 | Beard | 407/33 X |
| 3,821,837 | 7/1974 | Faber | 407/40 |
| 3,827,119 | 8/1974 | Bennett | 407/40 |

*Primary Examiner*—Harrison L. Hinson
*Attorney, Agent, or Firm*—Toren, McGeady and Stanger

[57] ABSTRACT

A conical reamer having an elongated, longitudinally tapering head formed with two longitudinal flutes and rotated about its longitudinal axis by an integral shank portion. An axially elongated groove continuously adjacent each flute is open in a forward, and closed in a rearward direction and receives an axially elongated, reversible cutting blade having a cutting edge exposed in the flute. A frontal end face of the blade diverges obliquely from a plane perpendicular to the reamer axis at one acute angle in a radial direction toward the axis, and at a second acute angle in a direction circumferential relative to the axis. The end face is conformingly engaged in area contact by an abutment face of a clamping ring under the pressure of a clamping screw on the head.

6 Claims, 9 Drawing Figures

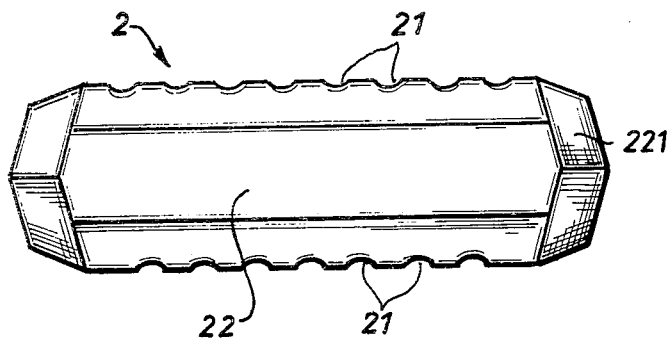
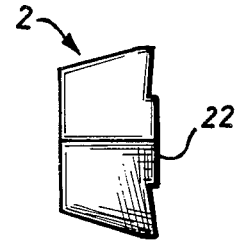
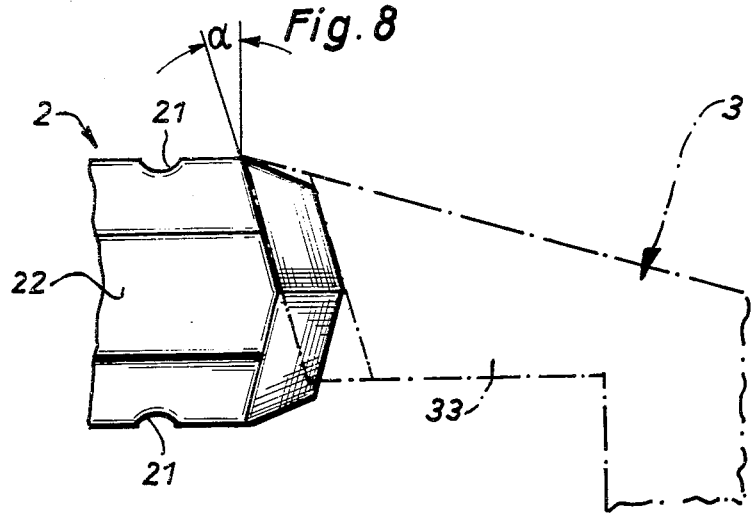
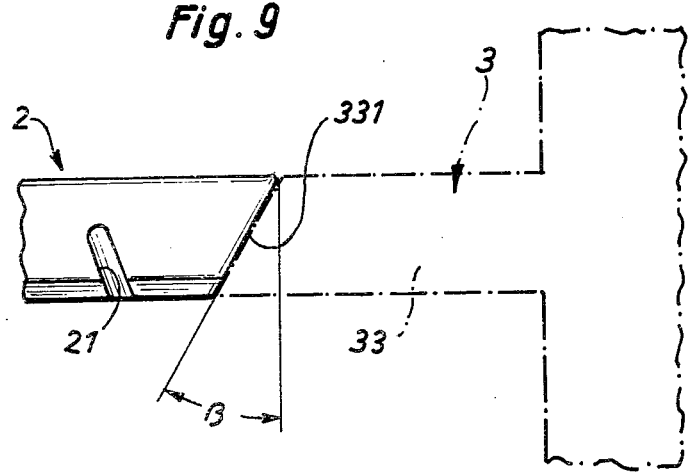

CONICAL REAMER

This invention relates to conical reamers and particularly to a conical reamer having a plurality of cutting edges elongated in the direction of the axis of rotation.

Known reamers having a plurality of cutting edges defining a conical surface have cutting edges fixedly arranged on the cutter head. The known conical reamers having replaceable and adjustable cutting blades have single blades and heads provided with very small flutes because of the space requirements of the blade clamping and adjusting devices, and can be used for making finishing cuts only because of the limited chip removal.

It is an important object of the invention to provide a reamer capable of conically enlarging a cylindrical bore at the high rate available from multiple blades and large flutes, yet employing replaceable, and preferably reversible blades to avoid the costly and time-consuming grinding of a cutter head equipped with fixed cutting edges.

Another object is the provision of a conical reamer which produces conical bores of precisely predictable and reproducible dimensions.

It is known to secure releasable cutting blades of reamers by means of clamping jaws. This expedient is not available in a reamer of the type under discussion, because the known clamping arrangement would interfere with the removal of the large and numerous boring chips from the cutting area, the problem being further complicated by the fact that conical reamers have their principal filed of application in the conical expansion of very small bores.

The problems outlined above are solved according to the invention by a reamer whose elongated, longitudinally tapering head is formed with longitudinal flutes and an axially elongated groove contiguously adjacent each groove, the groove being open in a forward direction and closed in a rearward direction. An axially elongated cutting blade is received in each groove, and a portion of the blade, including a cutting edge is exposed in the adjacent flute. A frontal end face of the blade diverges obliquely from a plane perpendicular to the direction of blade elongation at a first acute angle in a radial direction toward the axis of rotation, and at a second acute angle in a direction circumferential relative to the axis. An abutment face of a clamping member conformingly engages the end face in area contact, and is itself urged axially rearward so that the blade is secured axially and also biased radially toward the axial bottom wall of the receiving groove.

Other features, additional objects, and many of the attendant advantages of this invention will readily be appreciated as the same becomes better understood from the following detailed description of a preferred embodiment when taken in consideration of the appended drawing in which:

FIG. 6 shows one of the two identical cutting blades in the reamer of FIG. 1 in enlarged top plan view;

FIG. 7 is a front-elevational view of the blade of FIG. 6;

FIG. 8 shows the front end portion of the blade of FIG. 6 on a further enlarged scale and an associated part of the clamping ring in phantom view;

FIG. 9 illustrates the device of FIG. 8 on the same scale in a view corresponding to FIGS. 1 and 5.

Figure 1:
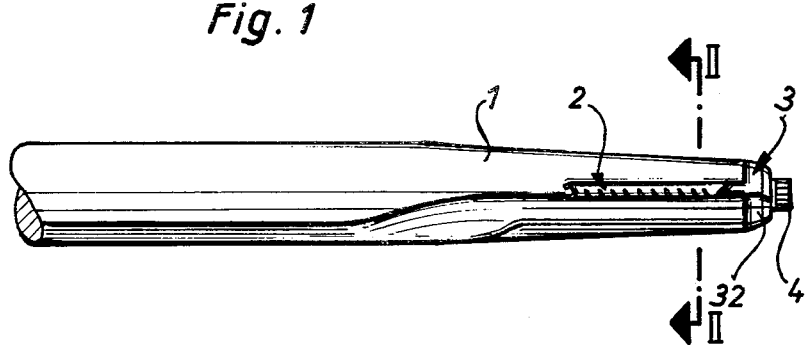
FIG. 1 shows the front portion of a conical reamer of the invention in side elevation.
Figure 2:
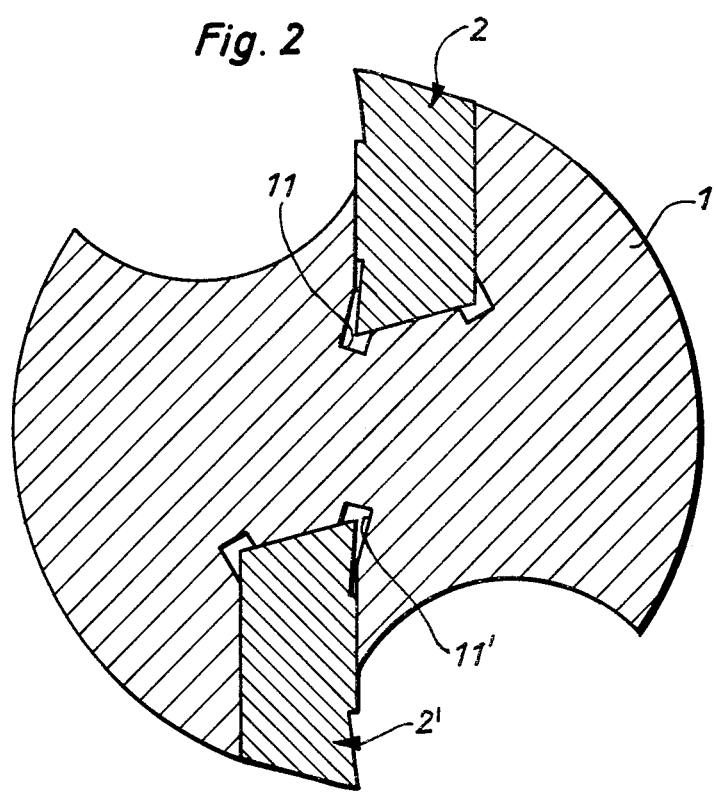
FIG. 2 illustrates the reamer of FIG. 1 in greatly enlarged front-elevational section on the line II—II.

Referring now to the drawing in detail, and initially to FIG. 1, there is seen the shank of a reamer whose conically tapering front end or head 1 is provided with two diametrically opposite flutes of approximately circularly arcuate cross section best seen in FIG. 2. The head 1 is rotated about its longitudinal axis counterclockwise, as viewed in FIG. 2, by the rear portion of the shank and is formed with two axially elongated grooves 11, 11' which receive respective cutting blades 2, 2'. The leading faces of the blades are respectively radial relative to the axis of reamer rotation and partly exposed to the two flutes. The cutting edges of the blades are inclined at a small acute angle relative to the axis of rotation.

The grooves 11, 11' are closed in a rearward, and open in a forward direction. A clamping ring 3 prevents the blades from forward movement in the respective grooves, and is itself held in position by a clamping screw 4.

Figure 3:
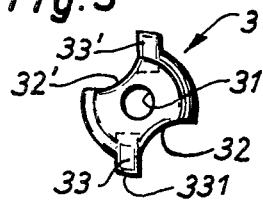
FIG. 3 is a front-elevational view of a clamping ring in the reamer of FIG. 1 on a somewhat larger scale.
Figure 4:
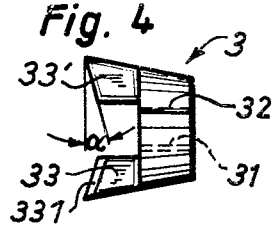
FIG. 4 shows the clamping ring of FIG. 4 in top plan view.
Figure 5:
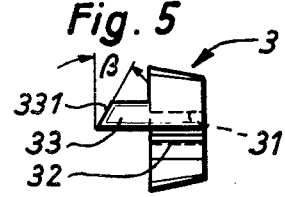
FIG. 5 illustrates the clamping ring in a view corresponding to that of FIG. 1.

As is better seen in FIGS. 3 to 5, the screw 4 passes through a central opening 31 in the ring 3 into a threaded, axial bore of the head 1, not specifically illustrated. The ring 3 is frustoconical overall shape, and its circumferential face is flush with that of the head 1. Recesses 32, 32' in the ring 3 are axially aligned with the matching flutes in the head 1, and rearwardly flaring, diametrically opposite projections 33, 33' of the ring 3 are conformingly received in the grooves 11, 11' respectively. The rear face 331 of each projection 33, 33' is planar and diverges obliquely relative to a plane perpendicular to the axis of rotation by an acute angle $\alpha$ of approximately 17° in a radially inward direction as shown in FIG. 4, and at an angle $\beta$ of approximately 30° in a circumferential direction, as is seen in FIG. 5.

Each cutting blade has the approximate cross-sectional shape of an equilateral trapzeoid, its larger base being recessed to leave a central land 22 parallel to the smaller base. The cutting edges which flank the larger base are formed with evenly spaced notches 21 which are axially offset in the two edges. The blade is symmetrical relative to a plane equidistant from the two cutting edges and perpendicular to the bases of the trapezoidal cross section, as well as relative to another plane perpendicular to the axis of rotation. The blade is bounded in each axial direction by two symmetrical face portions of which one face portion 221 is engaged conformingly in area contact by the rear face 331 of an abuttingly engaged projection on the clamping ring 3. The two axially terminal rear face portions of the blade are both similarly engaged by the non-illustrated wall of the head 1 which rearwardly bounds the corresponding groove 11, 11'. The blades may thus be reversed when one of the cutting edges becomes dull to expose the other edge previously recessed in the groove 11, 11'. The two blades are inserted in the grooves 11, 11' in such a manner that the notches 21 of the exposed cutting edges are axially offset.

Engagement of the end faces 221, 331 under the clamping pressure of the screw 4 causes each blade 2, 2' to be held fast against the non-illustrated rear wall of the associated groove 11, 11' as well as radially against the axial bottom wall of the groove as is seen best in FIG. 2. The notches 21 cause the blades to cut narrow chips from the work piece which are readily discharged through the recesses 32, 32' and the aligned flutes of the shank.

It should be understood, of course, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

What is claimed is:

1. A conical reamer comprising:
   (a) an elongated, longitudinally tapering head formed with a plurality of longitudinal flutes;
   (b) means for rotating said head about a longitudinal axis, said head being formed with an axially elongated groove contiguously adjacent each flute, each groove being open in a forward axial direction and closed in a rearward axial direction;
   (c) an axially elongated cutting blade received in each groove, a portion of each blade including a cutting edge terminating at a blade face exposed in the adjacent flute,
      (1) said blade having a frontal end face diverging obliquely from a plane perpendicular to the direction of blade elongation at a first, acute angle in a radial direction toward said axis, and at a second acute angle in a circumferential direction relative to said axis;
   (d) a clamping member having an abutment face conforming with said end face of said blade and arranged in area contact therewith to hold said blade within said groove; and
   (e) clamping means on said head urging said abutment face axially rearward and against said end face of said blade.

2. A reamer as set forth in claim 1, wherein said clamping member has a plurality of projections extending axially rearward into said recesses respectively, each projection carrying one of said abutment faces engaging the end faces of said blades in the respective grooves.

3. A reamer as set forth in claim 2, wherein said head is formed with two of said flutes and two of said grooves, said two grooves being diametrically opposite each other and receiving respective cutting blades.

4. A reamer as set forth in claim 3, wherein each cutting blade is symmetrical relative to a first longitudinal plane of symmetry and relative to a second plane perpendicular to said first plane.

5. A reamer as set forth in claim 4, wherein said blade has two axially elongated cutting edges, each formed with a plurality of axially spaced notches.

6. A reamer as set forth in claim 5, wherein the notches in the exposed cutting edge of one blade are axially offset from the notches in the exposed cutting edge of the other blade.

* * * * *